Sept. 20, 1932.   B. R. BENJAMIN ET AL   1,878,811
TRACTION WHEEL
Filed June 12, 1929   2 Sheets-Sheet 1

Inventors
Bert R. Benjamin,
Walter R. Peterson
By
Atty.

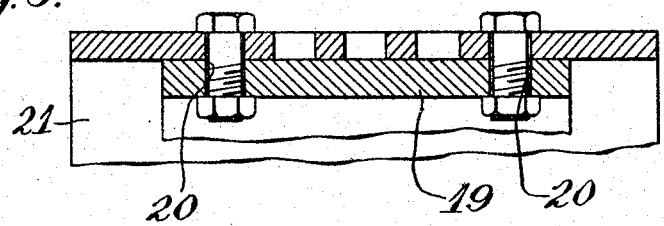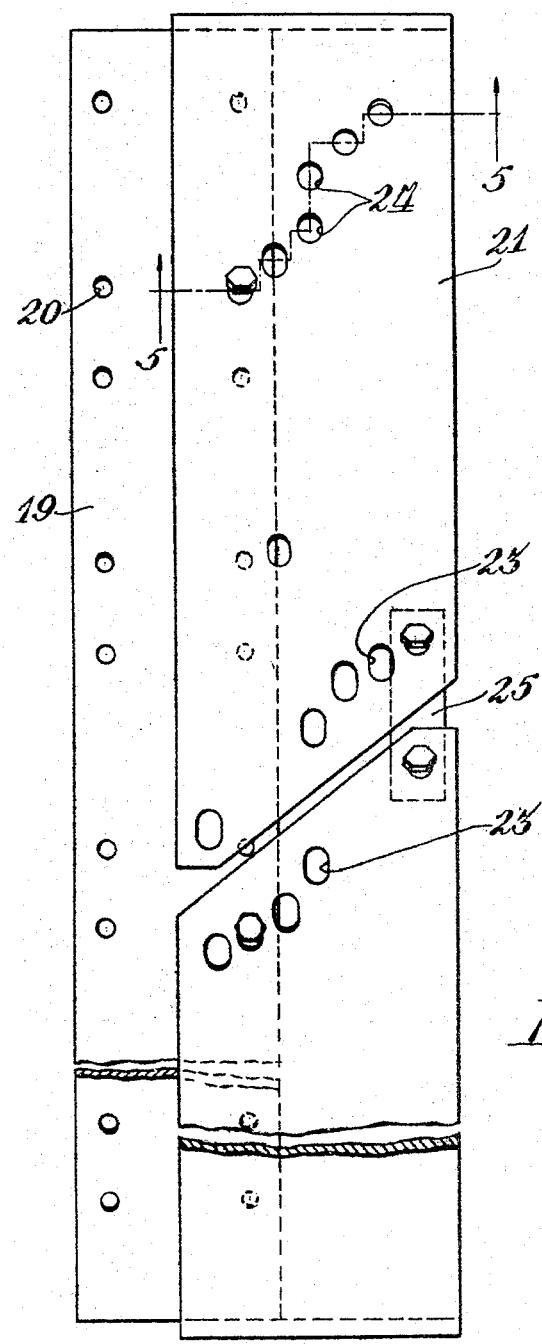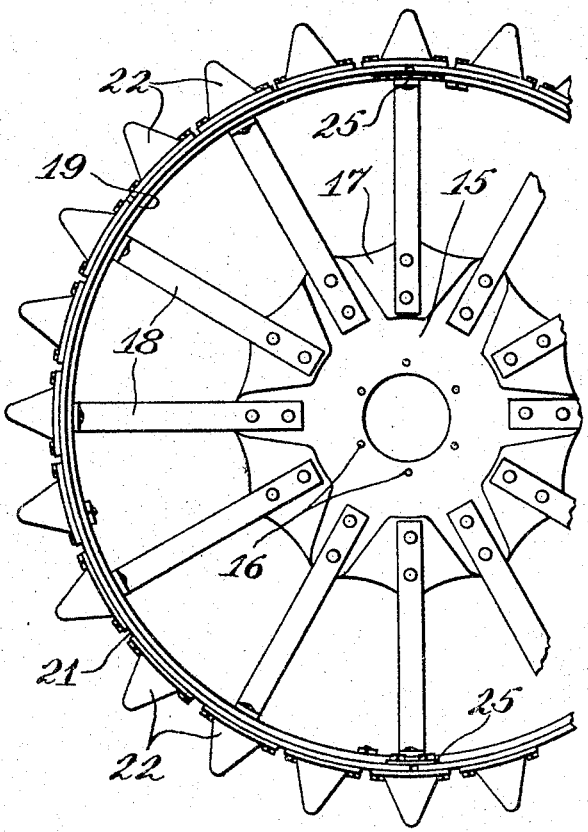

Patented Sept. 20, 1932

1,878,811

UNITED STATES PATENT OFFICE

BERT R. BENJAMIN, OF OAK PARK, AND WALTER R. PETERSON, OF PARK RIDGE, ILLINOIS, ASSIGNORS TO INTERNATIONAL HARVESTER COMPANY, A CORPORATION OF NEW JERSEY

TRACTION WHEEL

Application filed June 12, 1929. Serial No. 370,279.

The present invention relates in general to tractors and more particularly to structure for varying the width of tread or space spanned by the tractor wheels.

In connection with the use of row crop tractors, it is desirable to provide a standardized construction that will permit the traction wheels of the tractor to be given the particular and exact width of tread necessary to meet the various row spacings of the different row grown crops, such as beets, potatoes, beans, corn, cotton, etc. A capacity for fine adjustment of tread width within comparatively wide limitations is, therefore, necessary in a general purpose tractor capable of carrying tillage tools adapted to the various crops. It is accordingly the main object of this invention to provide a tractor wheel assembly having a structure embodying means for changing the location of its tread line with respect to its supporting means or axle through graduated steps within a predetermined range of adjustment. This object and other objects and advantages inherent in a structure embodying the invention are attained by providing an organization comprising a reversible wheel having thereon a laterally adjustable overtire and involving novel features of combination and details of construction hereinafter more particularly described and claimed, and illustrated in the accompanying drawings, where:

Figure 3 is a side elevation of the wheel, partly broken away;

Figure 4 is an enlarged detail view of the wheel tread and overtire;

Figure 5 is a detail section on the line 5—5 (Figure 4), but showing the overtire centrally positioned on the wheel tread; and, Figure 6 is a plane development of one section of the overtire.

Figure 1:
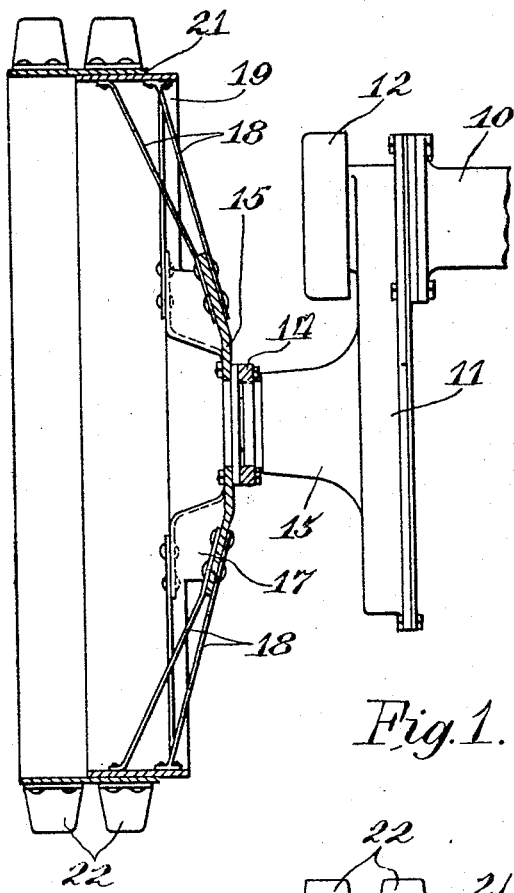
Figure 1 is a rear elevation of a wheel in section and a portion of a tractor axle with the wheel shown at one extreme of adjustment.
Figure 2:
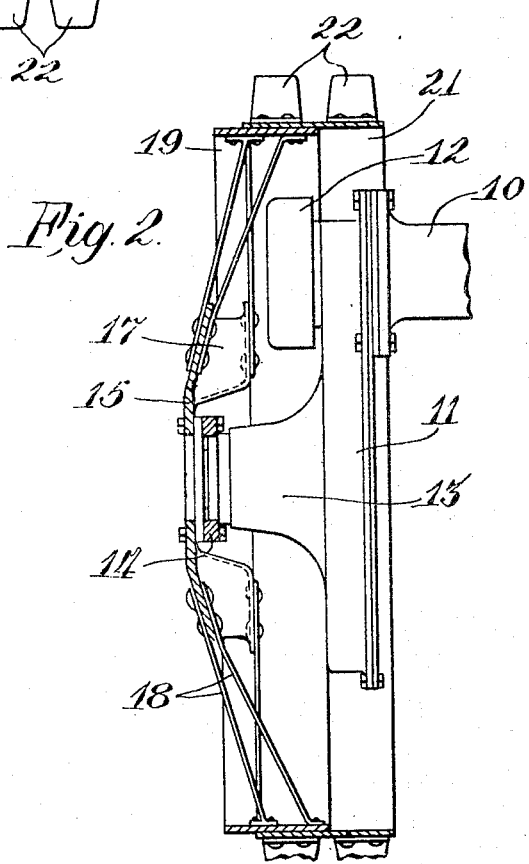
Figure 2 is a similar view with the wheel at its opposite extreme of adjustment.

In the present instance the invention has been illustrated as carried on the type of tractor having an arched rear axle structure comprising a transverse axle housing shown at 10 (Figure 1) and depending end housings 11, only one of which is shown. The axle housing 10 contains differentially driven axle shafts on the ends of which are brake drums 12. The depending housing 11 on each end of the axle is formed with an outwardly projecting sleeve 13 within which is journaled a spindle fixed to a large gear contained within the housing 11 and driven from one of the axle shafts. The end of the spindle beyond sleeve 13 has secured to it a hub flange 14 to which the tractor wheel is adapted to be bolted. The wheel structure embodying the invention preferably comprises a flat central disk portion 15 having bolt openings 16 which register with corresponding bolt openings in the hub flange 14 for receiving the mounting bolts. The disk portion 15 of the wheel is formed with a scalloped peripheral flange 17 which is offset lateraly from the vertical plane of the central disk portion 15 to provide a dished or concave hub structure having laterally offset spoke seats. Spokes 18 extend from alternate seats on the flange 17 to the permanent wheel tread or rim 19, which is positioned at one side of the vertical plane of the central portion 15 of the wheel hub. The construction of the central disk portion 15 of the hub is such as to allow either side thereof to be secured against the spindle flange 14. As the general shape of the wheel structure is concavo-convex, this permits its permanent tread to be shifted by reversal of the wheel from the position shown in Figure 1 to that shown in Figure 2, thus affording a coarse or basic adjustment of tread width. The permanent tread 19 of the wheel is provided with spaced apertures 20 throughout its circumference, which are arranged in pairs, as illustrated, and are designed for the reception of securing bolts for traction lugs when the wheel is to be used without the further structure to be described.

Figure 6:
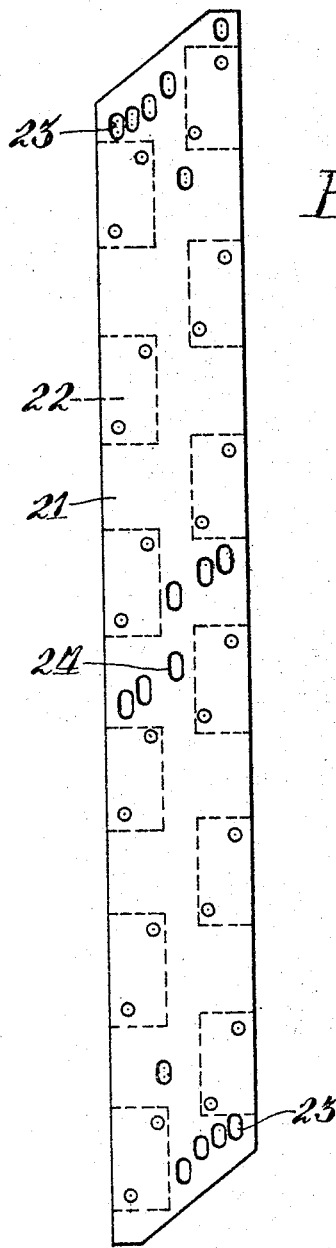

In order to provide for further and finer adjustment of the width of tread, the permanent tread 19 of the wheel is equipped with an overtire preferably composed of two sections 21. These sections are duplicates. The abutting ends are cut on oblique lines and each section extends around half the circumference of the wheel tread. The respective sections forming the overtire are wider than the permanent tread 19 of the wheel, as is best shown in Figure 5. Each section has permanently secured to it spaced triangular lugs 22 which are preferably arranged in staggered relation with the bases of the lugs secured along opposite edges of each of the overtire sections 21. The oblique ends of the overtire sections allow the lugs to be evenly spaced, as shown in Figure 6. In order to provide for bolting of the overtire to the tread 19 at a multiplicity of lateral adjustments, either centrally of or in overhanging relation to either side of the rim 19, each overtire section is formed with an oblique series of bolt receiving apertures 23 parallel to each end and with another series 24 in its mid portion. The apertures 23 and 24 are preferably slightly oblong, in order to provide for proper register with the bolt holes 20 in the wheel rim irrespective of slight variations in fit of the overtire on the rim. The oblique arrangement of the apertures 23 and 24 in the overtire sections permits the lugs to be disposed thereon in staggered relation and permits the openings to be brought into registry successively with different holes 20 in the rim by slightly varying the position of the overtire circumferentially and laterally on the rim 19, and at the same time the material of the overtire is not weakened by the apertures as would be the case if the series of closely spaced apertures were in a straight transverse line. When the overtire sections are mounted on the rim 19 in overhanging relation to one edge thereof, the obliquely cut ends of the overtire sections are preferably connected near the outer edges of the overtire by link plates 25 (Figure 4) bolted to the respective sections.

With an overtire constructed as described and having apertures related to others in the wheel rim in the manner stated it becomes possible to further vary the tread line of the lug carrying portion of each tractor wheel tread by shifting the overtire from the central position illustrated in Figure 5 to a laterally adjusted position in which it overhangs either one side or the other of the wheel rim. This capacity for adjustment, plus reversibility of the wheel, affords a construction in which almost any desired adjustment within wide limits can be effected to meet the requirements of various row crops, as the lug carrying overtire can be located midway between rows where the action of the lugs on the soil will not injure the plants.

While the foregoing description exemplifies a preferred embodiment of the invention, considerable variation therefrom is obviously possible without departure from the spirit of the invention as defined in the following claims.

What is claimed is:

1. The combination with a traction wheel having a permanent tread provided with apertures formed at spaced points about its circumference, of an overtire wider than the tread and laterally adjustable thereon comprising a plurality of sections engaging the tread and having abutting ends cut on oblique lines, uniformly spaced lugs secured to each section from end to end thereof and disposed in staggered relation along the edges of the section, each section being formed with a series of apertures formed on oblique lines adjacent said ends of the sections and selectively registrable with the apertures in the permanent tread, and securing means selectively engageable in the registered apertures.

2. An overtire for traction wheels comprising a plurality of band-like sections, each section having end edges extending on parallel oblique lines, and triangular spade lugs having their bases secured in closely spaced relation along the side edges of each section from end to end thereof with the lugs on the sections disposed in uniform staggered relation.

In testimony whereof we affix our signatures.

BERT R. BENJAMIN.
WALTER R. PETERSON.